E. E. COLE.
CAMERA AND FILM PACKAGE THEREFOR.
APPLICATION FILED JUNE 24, 1909.

981,064.

Patented Jan. 10, 1911.
2 SHEETS—SHEET 1.

Witnesses
George E. Higham.
Leonard W. Novander.

Inventor
Ernest E. Cole
By Bravco Williams
Attorneys

E. E. COLE.
CAMERA AND FILM PACKAGE THEREFOR.
APPLICATION FILED JUNE 24, 1909.

981,064.

Patented Jan. 10, 1911.

2 SHEETS—SHEET 2.

Witnesses
George E. Higham.
Leonard W. Novander

Inventor
Ernest E. Cole
By Brown Williams
Attorneys

UNITED STATES PATENT OFFICE.

ERNEST E. COLE, OF CHICAGO, ILLINOIS.

CAMERA AND FILM-PACKAGE THEREFOR.

981,064.	Specification of Letters Patent.	Patented Jan. 10, 1911.

Application filed June 24, 1909. Serial No. 503,981.

*To all whom it may concern:*

Be it known that I, ERNEST E. COLE, a citizen of the United States, residing at Chicago, in the county of Cook and State of Illinois, have invented a certain new and Improved Camera and Film-Package Therefor, of which the following is a full, clear, concise, and exact description, reference being had to the accompanying drawings, forming a part of this specification.

My invention relates to an improved camera construction and film package for use therewith, by means of which data concerning the exposures may be made and preserved with the exposed film itself until the film is developed.

My invention further consists in forming identification characters upon the memorandum slip and the strip of sensitive film by means of which the several exposures after they are made may be readily associated with the exposure data referred to.

Figure 1:
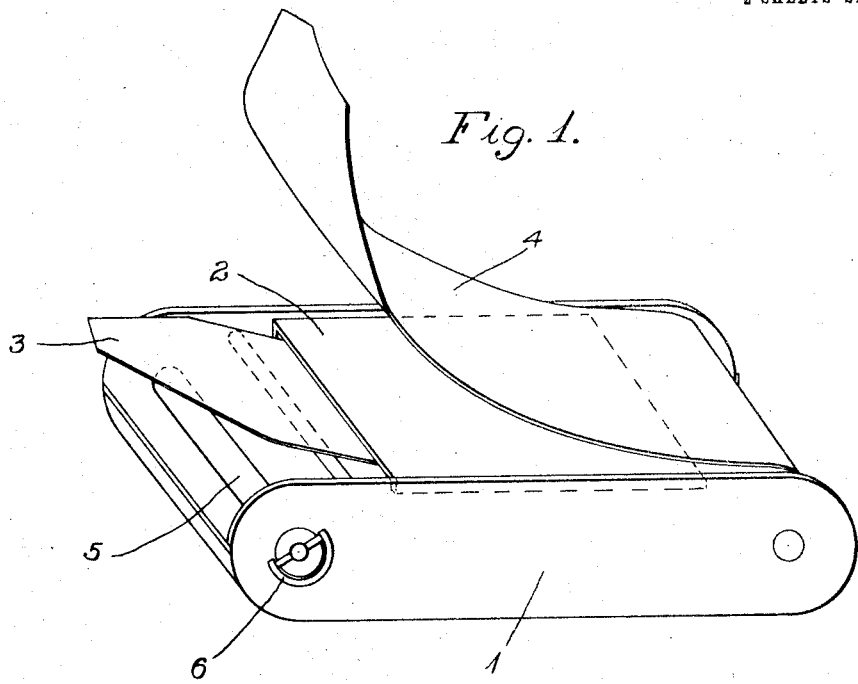
Figure 2:
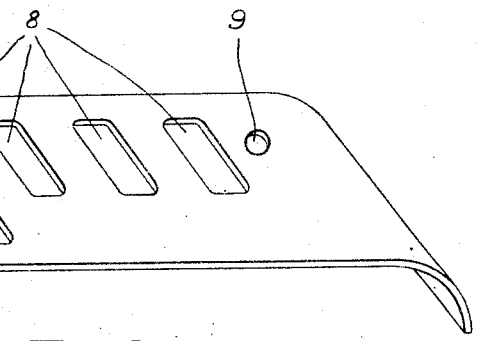
Figure 3:
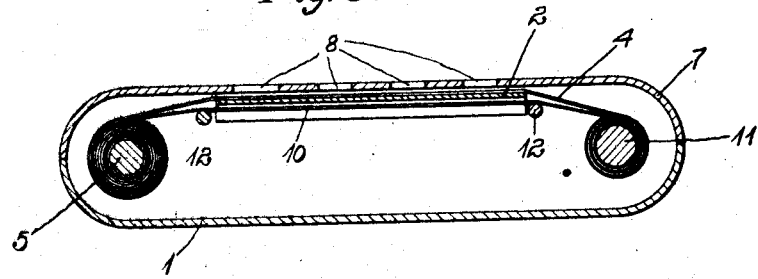
Figure 4:
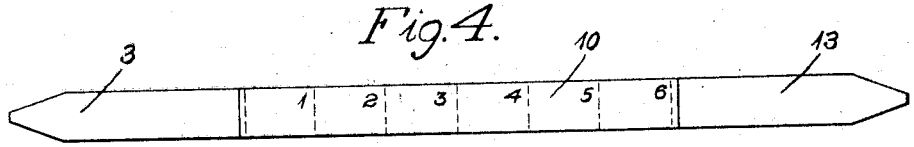
Figure 5:
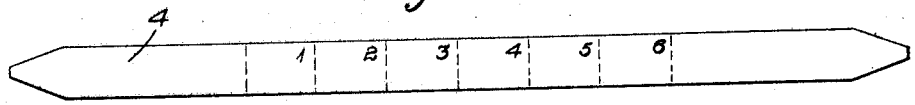
Figure 6:
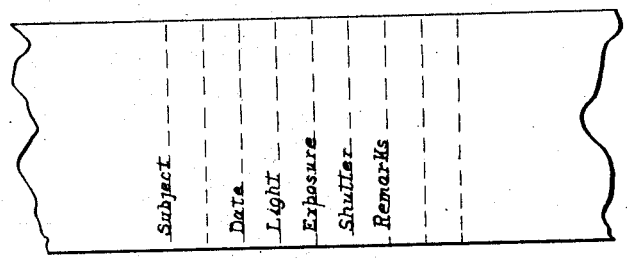

The several drawings illustrating my invention are as follows:

Figure 1 shows in perspective view a hand camera, the back of which is removed to show the arrangement in the camera of the film and memorandum strip composing my film package. Fig. 2 shows in perspective view the back of the camera conformed to facilitate making the memoranda referred to. Fig. 3 is a longitudinal sectional view taken through the camera transversely of the rolls used to supply and receive the film and memorandum strips. In this view the operating parts of the camera, consisting in the lens, shutter, &c., are not shown, since they form no part of my invention. Fig. 4 shows in developed view a strip of film adapted for use in my film package. Fig. 5 shows a strip of paper adapted to be associated with the film strip shown in Fig. 4 to receive the exposure data referred to. Fig. 6 shows a portion of the strip shown in Fig. 5, in an enlarged view, to show printed matter that may be used in connection with such memorandum strip if desired.

Similar numerals refer to similar parts throughout the several views.

As shown in Figs. 1, 2 and 3, the camera box 1 is formed in a manner usual in camera construction, with the exception that an additional removable backing board 2 is employed, such board or plate being placed in the position indicated in Fig. 1 after the end 3 of the film strip has been led from the supply roll, such board or plate 2 being caused to occupy a position between the film strip and the strip 4 used to receive the desired memoranda concerning the exposures. After the board or plate 2 is located in the position indicated in Fig. 1, the ends of the strips 3 and 4 are secured in the roller 5 adapted to receive the same, and such roller is operated in the customary manner, by means of the handle 6, to successively bring unexposed portions of the film into operative position in the camera.

The back 7 used in connection with my invention has formed therein a plurality of openings 8, through which desired memoranda concerning each exposure may be made upon the strip 4. A sight opening 9 is also provided in the camera back 7 to indicate when the film strip and memorandum strip have been moved to a proper position to make the next exposure.

As shown in Fig. 3, the memorandum strip 4 and the film strip 10 are shown as having been partly unwound from the supply roller 11 and partly wound upon the receiving roller 5. The film strip 10 is led around the guiding posts 12 to cause it to assume a proper position inside of the plate or board 2, while the memorandum strip 4 passes over the plate 2 in a position to be readily marked upon through the openings 8 formed in the back 7 of the camera. The plate 2 serves the double purpose of protecting the film 10 from the light that might enter the camera through the openings 8 and also of providing a suitable surface for backing up the strip 4 so that the desired memoranda may be made thereon.

The film strip 10, as shown in Fig. 4, consists preferably of a length of film slightly longer than that necessary to make the number of exposures desired, and to this strip of film, end strips 3 and 13 are secured in any suitable way, as by gluing the strips together. The several exposures that the strip of film 10 is adapted to receive are indicated in Fig. 4 by the spaces between the dotted lines, and are designated by the numerals 1 to 6, inclusive. It is to be understood that, in practice, the dotted lines are not placed upon the film, but that they are used in the drawing merely to indicate the portions of the film that are successively brought into operative position in the camera. The designating characters are, however, placed upon the film, and may either consist of numerals, as indicated, or of any equivalent identifying chracteristic that may be marked or impressed upon the film. The end strips 3 and 13 are made preferably of paper of such a nature as to be opaque to the light, so that when wrapped around the film 10 upon either of the rollers 5 or 11, the sensitive film is protected thereby. The memorandum strip 4, shown in Fig. 5, is also preferably made of paper of such a nature as to protect the sensitive film 10 from the action of the light, and this strip of paper 4 carries upon it identifying characters corresponding to the identifying characters placed upon the film 10, which I have shown in Fig. 5 as the numerals 1 to 6, inclusive but which may consist of any similar identifying characters. These characters are preferably so placed that they may further serve as stop indications, which when brought opposite the opening 9 in the camera back indicate that the film 10 has been brought to a proper position for the next exposure. Each space upon the strip 4 corresponding to one of the exposures of the film 10 may be provided, if desired, with printed headings, as indicated in Fig. 6, concerning the different matters of interest to be noted in connection with each exposure. These headings are so spaced that when the identifying characters come opposite the opening 9, these headings will be in line with the openings 8.

While I have shown the film strip 10 as consisting of a central portion of sensitized film to which the protecting end strips 3 and 13 are secured, it is clear that this exact construction may be modified without departing from the spirt of my invention. It is further to be noted that any kind and color of paper may be used, either for the end strips 3 and 13 or for the memorandum strip 4, that will secure the required protection for the film 10 and afford a suitable marking surface for noting the data concerning the exposures.

In preparing the supply rollers 11, the strip 4 is placed upon the strip 10, and the two strips together wound upon such roller in such a manner that when the strips are wound onto the receiving roller 5 in the camera, the several exposures of the strip 10 are brought into operative position at the same time that the identifying characters carried by the strip 4 are brought opposite the sight opening 9.

The film package above described provides that the exposures after they are made and the memoranda of interest concerning them are preserved together until the film is developed, at which time the paper strip may be readily separated from the strip of film, whether the process known as tank development is used or the film is developed by hand, and when thus separated, the identifying characters above referred to constitute a means for indicating to which exposure any particular group of memoranda belongs.

While I have shown my invention in the particular embodiment herein described, I do not, however, limit myself to this exact construction, but desire to claim any equivalent that will suggest itself to those skilled in the art.

I claim:

1. In combination with a camera, a supply roller, a receiving roller, a backing member disposed between said rollers, a strip of film extending from the supply roller and passing on one side of said backing member to the receiving roller, and a separate strip of paper associated with the strip of film for passing on the opposite side of said backing member and arranged to receive memoranda for registering the exposures made on the film.

2. A film package for cameras consisting in the combination of a roller for holding the film, a strip of film, and a separate strip of paper associated with the strip of film for receiving memoranda of the exposures made on the film, such strips wound together upon the roller, there being identification characters upon the paper and upon the film for determining the exposure to which the memoranda relate.

3. A film package for cameras consisting in the combination of a roller for holding the film, a strip of film, and a separate strip of paper associated with the strip of film for receiving memoranda of the exposures made on the film, such strips wound together upon the roller, there being identification characters upon the paper and upon the film for determining the exposure to which the memoranda relate, the identification characters upon the strip of paper also serving to indicate the proper adjustment of the film in the camera for receiving the exposures.

4. A film package for cameras consisting in the combination of a roller for holding the film, a strip of film, and a separate strip of paper associated with the strip of film for receiving memoranda of the exposures made on the film, such strips wound together upon the roller, such paper strip and the associated film having identification characters thereon for determining the exposure to which the memoranda relate, the identification characters upon the strip of paper also serving to indicate the proper adjustment of the film in the camera for receiving the exposures, such paper strip also containing printed matter relating to the memoranda to be entered thereon.

5. In combination with a camera having a supply roller, of a receiving roller, a backing member disposed between said rollers, a strip of film extending from the supply roller and passing on one side of said backing member to the receiving roller, and a separate similar strip of paper associated with the strip of film passing on the opposite side of said backing member for registering the exposures made thereon, the back of the camera having an opening therein through which memoranda may be made on such strip of paper.

6. In combination with a camera having a supply roller, a receiving roller, a strip of film extending from the supply roller to the receiving roller, a separate similar strip of paper associated with the strip of film for registering the exposures made thereon, the back of the camera having openings therein through which memoranda may be made on such strip of paper, and a shield between the strip of film and the strip of paper to form a backing plate when making such memoranda.

7. In combination with a camera having a supply roller, a receiving roller, a strip of film extending from the supply roller to the receiving roller, and a separate similar strip of paper associated with the strip of film for registering the exposures made thereon, the back of the camera having an opening therein through which memoranda may be made on such strip of paper, the paper strip and the film having identification characters for determining the exposure to which the memoranda relate, the identification characters upon the strip of paper also serving in connection with an opening in the camera back to determine the proper adjustment of the film in the camera.

8. A film package for cameras comprising a roller for holding the film, a strip of film, and a separate strip of relatively light-proof material associated with the strip of film for receiving memoranda of the exposures made on the film, such strips wound together upon the roller, there being identification characters upon the film and upon the relatively light-proof strip for determining the exposures to which the memoranda relate.

9. In a camera, a supply roller upon which a rolled strip of photographic film and a parallel strip of paper may be mounted, a receiving roller for receiving said strips, and a backing member mounted between said rollers, said backing member being arranged so that the film may pass upon one side thereof and the paper upon the other side thereof, and said camera having an opening therein to provide for access to said paper.

In witness whereof, I hereunto subscribe my name, this 19th day of June, 1909.

ERNEST E. COLE.

Witnesses:
ALBERT C. BELL,
ROBERT F. BRACKE.